United States Patent
Goldstein et al.

[11] Patent Number: 6,065,418
[45] Date of Patent: May 23, 2000

[54] SEQUENCE OF SELECTIVE EMITTERS MATCHED TO A SEQUENCE OF PHOTOVOLTAIC COLLECTORS

[75] Inventors: Mark K. Goldstein, Del Mar; Aleksandr S. Kushch, Poway, both of Calif.

[73] Assignee: Quantum Group, Inc., San Diego, Calif.

[21] Appl. No.: 08/771,822

[22] Filed: Dec. 12, 1996

Related U.S. Application Data

[60] Provisional application No. 60/011,323, Feb. 8, 1996.

[51] Int. Cl.$^7$ ....................................................... B63G 8/00
[52] U.S. Cl. ........................................... 114/312; 136/253
[58] Field of Search ................................... 114/312, 313, 114/322, 382; 136/253

[56] References Cited

U.S. PATENT DOCUMENTS

| | | | |
|---|---|---|---|
| 3,561,387 | 2/1971 | Kumm et al. | 114/322 |
| 4,010,619 | 3/1977 | Hightower et al. | 114/322 |
| 4,776,895 | 10/1988 | Goldstein | 136/253 |
| 5,356,487 | 10/1994 | Goldstein et al. | 136/253 |
| 5,500,054 | 3/1996 | Goldstein | 136/253 |
| 5,503,685 | 4/1996 | Goldstein | 136/253 |
| 5,686,368 | 11/1997 | Wong | 501/152 |

*Primary Examiner*—Sherman Basinger
*Attorney, Agent, or Firm*—Christie, Parker & Hale, LLP

[57] ABSTRACT

A thermophotovoltaic electric generating system provides high thermal to electric conversion efficiency by use of a sequence of matched radiation emitters and radiation collectors. The radiation emitters comprises ceramic materials which emit thermally stimulated quantum radiation in at least one characteristic wavelength bands when heated above a threshold temperature. By employing a sequence of selective emitters such as rare earth metal oxide, more than 50% of the radiation emitted from the surface can be concentrated in two or more characteristic wavelength bands. A sequence of corresponding photovoltaic device selectively absorbing and efficiently converting the radiation at the characteristic wavelength bands for high electric conversion efficiency in each zone, respectively. An overlying layer of the photovoltaic collector selectively absorbs at least one of such characteristic wavelength bands. A second underling PV material may be used to collect longer wave length photons from adjacent selective and non selective materials as the top layer may be transparent to longer wavelength band which is absorbed by an underlying photovoltaic layer. Preferably the emitter is a rare earth metal oxide. A ceramic tube burner may be used in an embodiment with preheated air, the outside of the tube having such a thermally stimulated quantum emitter. In addition the use of sequenced SELP may be used. A transparent fuel/oxidizer mixture distributive layer for combustion TPV system that provides photon transmission to the PV cells which are protected either on the back side of the distributive plenum or outside of this plenum if the back is also transparent. When PV cells are located inside of the distributive plenum, the incoming fuel/oxidizer mixture provides the PV cooling that enhances PV thermal management and heats the combustible mixture, so increasing overall efficiency. When PV cells are located outside of the distributive plenum the back side of this plenum may be made of band pass filter or coated with a reflective material that allows to pass only narrow band photons to PV cell.

32 Claims, 4 Drawing Sheets

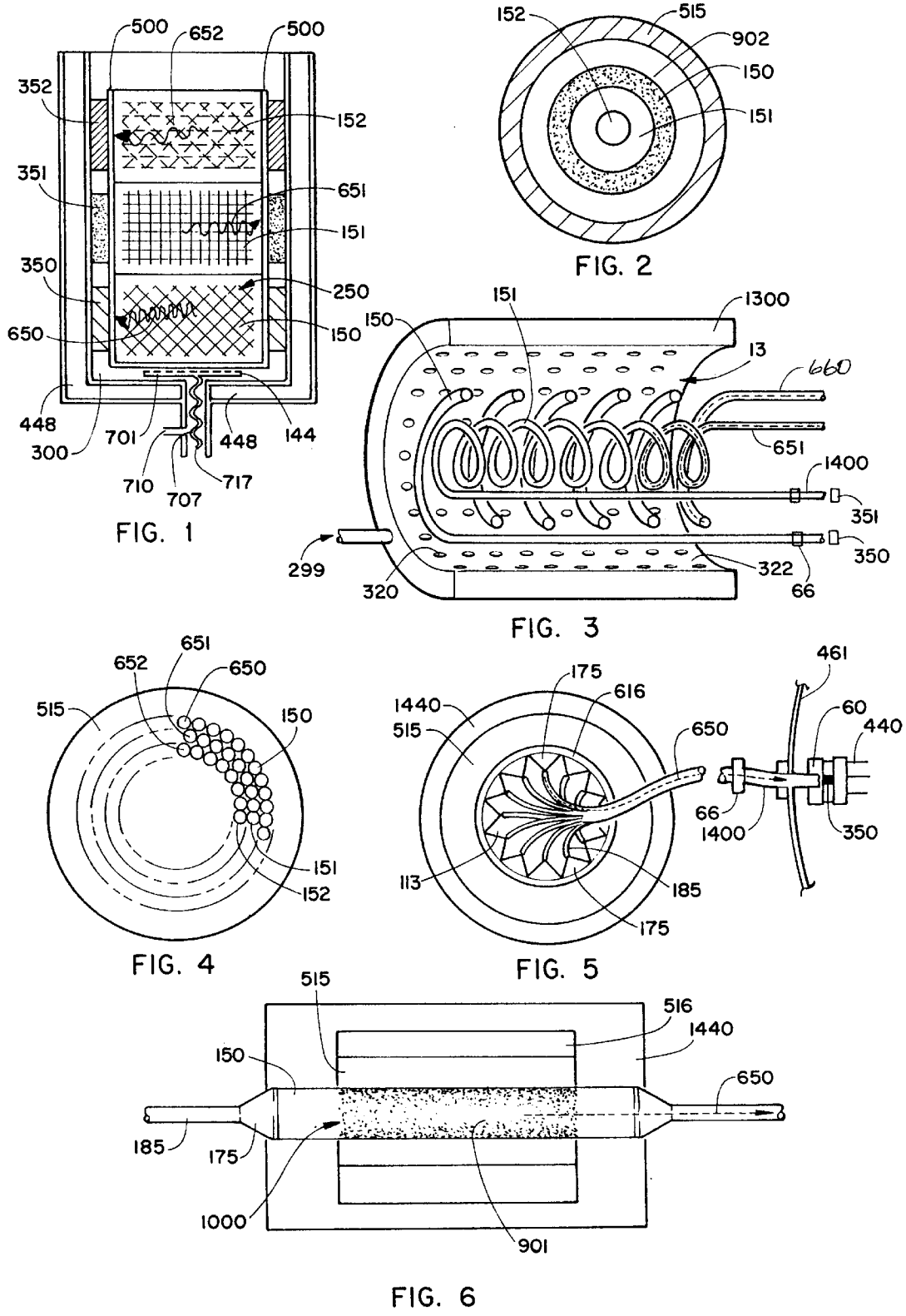

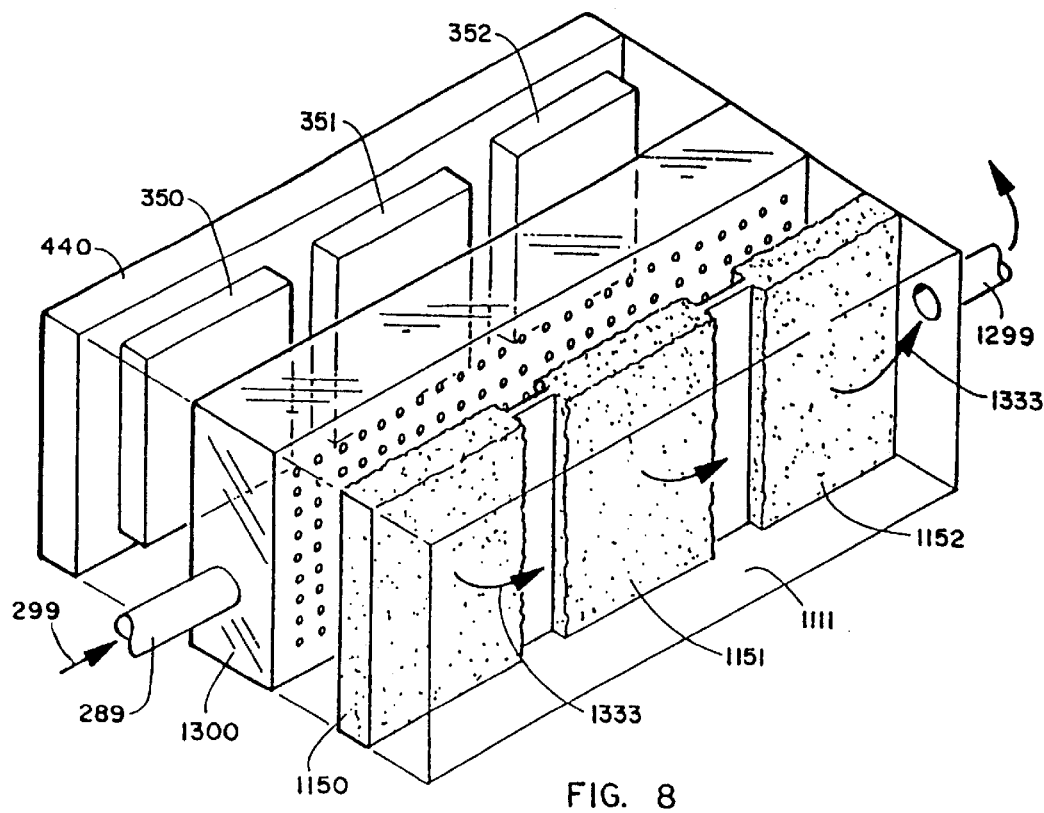
FIG. 8
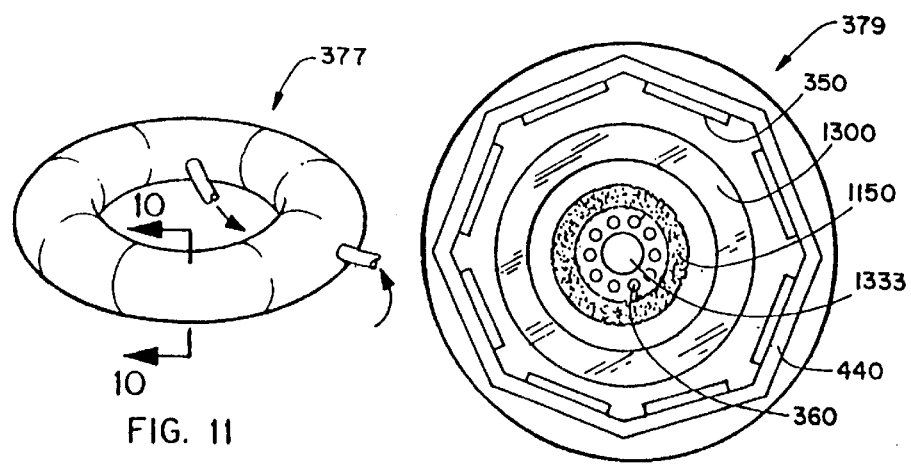
FIG. 11
FIG. 10

SEQUENCE OF SELECTIVE EMITTERS MATCHED TO A SEQUENCE OF PHOTOVOLTAIC COLLECTORS

RELATED APPLICATIONS

Priority is claimed from provisional patent application Ser. No. 60/011,323 filed Feb. 8, 1996.

BACKGROUND OF THE INVENTION

This invention relates to a thermophotovoltaic (TPV) apparatus for generating electricity using a sequence of selective emitter zones, each zone producing at least one spectral band matched to the absorption bands of a photovoltaic device. The highest temperature zone consists of an emitter with the highest energy photon emissions, and the second zone with the next highest energy and so on to produce a sequence of emitters that can remove more energy from the heat source than a single emitter system. The increase in efficiency results because the temperature drop of the multi-zone emitter system is greater than the temperature drop over any single emitter system.

Electric power can be generated by heating any photon emitter to a sufficient temperature that it will emit photons above the band gap of the PV. Such photons are absorbed by photovoltaic devices, such as a silicon cell, to produce an output voltage and current. In this novel invention a series of thermally stimulated quantum emitters, each of which produces radiation in a relatively narrow spectral band when heated above a threshold temperature, are matched to a corresponding PV cell. A variety of photovoltaic devices are commercially available for absorbing such radiation. In this invention these emitters are sequenced by zone to match the band gap of PV cell with the selected emissions such that the higher temperature, higher band gaps are closest to the heat source. Then the next highest and so on to produce a TPV system that is very efficient, because it can remove more energy from the heat source.

U.S. Pat. No. 3,188,836 by Kniebes describes utilization of emissive radiation from a glowing mantle in a gas lamp to generate sufficient power to control a valve. U.S. Pat. No. 3,331,701 by Werth provides a description of a thermophotovoltaic power producing device. R. M. Swanson in "Silicon Photovoltaic Cell in TPV Conversion," ER 1272, Project 790-2, Stanford Univ., (December 1979), who pioneered the fundamentals of blackbody thermophotovoltaic devices describes an efficient solar cell. This cell work was initiated to optimize the performance of silicon cells when used in conjunction with a blackbody emitter. Swanson has also reported that these cells produce electric power with an efficiency of 26% using a tungsten filament heated to about 2200° K. as the heat source. *Proceedings of IEEE* 67 (1979) 446;ER-1277, Project 790-2, Stanford Univ., (December 1979).

Narrow band emitters are known to be more efficient power generators than blackbody emitters, operating at the same input power level, that generate power by radiation. This is disclosed, e.g., in U.S. Pat. No. 4,973,799. In addition, European Patent Publication 84 306033.6 by Nelson, and European Patent Publication 83 108018.9 by Diederich disclose advantages of using rare earth metal oxide narrow band emitters matched to the absorption characteristics of photovoltaic devices. Goldstein also produce efficient energy conversion for use in powering various gas appliance in U.S. Pat. No. 4,906,178 as well in power production applications.

British Patent Number 124 by Carl Auer von Welsbach was the origin of the first successful gas light mantle almost 100 years ago. That structure comprises a thermally stimulated quantum emitter comprising ceria. Such a mantle is designed to emit a broad band spectrum of white light rather than a narrow band. In "High Temperature Spectral Emitters of Oxides of Erbium, Samarium, Neodymium, & Ytterbium" *Applied Spectroscopy,* 26 (1972) 60–65, Guido Guazzoni suggested the use of narrow band emitters for electric power production. His data suggested that the spectral emittance of ytterbia ($Yb_2O_3$) is particularly well suited for use with silicon photovoltaic devices in a power production system.

In the late 1970s and early 1980s there was appreciable research on blackbody thermophotovoltaic devices reported in R. N. Bracewell and R. M. Swanson, "Silicon Photovoltaic Cells in TPV Conversion," EPRI ER-633, (February 1978); J. C. Bass, N. B. Elsner, R. J. Meyer, P. H. Miller, Jr., and M. T. Sinmad, "Nuclear-Thermophotovoltaic Energy Conversion," NASA CR-167988 (GA-A16653) G. A. Technologies, Inc., (December 1983); L. D. Woolf, J. C. Bass, and N. B. Elsner, "Variable Band Gap Materials for Thermophotovoltaic Generators," GA-A18140, GA Technologies, Inc., (December 1983); and papers mentioned above. In these documents, Swanson indicates that efficiencies of at least 50% may be possible and he has measured photon conversion efficiencies of about 30% with a relatively crude experimental setup using a blackbody emitter. Fahrenbruch states that the photovoltaic conversion efficiency when using an emitter which emits narrow band radiation, may be much greater than that obtained using blackbody radiation.

The reason for this improvement in conversion efficiency is that the energy required to promote an electron from the conduction band to the valance band is equivalent to a specific quantity of energy or wavelength, the band gap energy. For each photon absorbed by the photovoltaic device, one electron is promoted into the conduction band. If the photons absorbed have energy in excess of the band gap energy, the excess energy is converted into heat or phonons and this decreases the conversion efficiency. It is, therefore, desirable to absorb radiation with minimal deviation from the band gap energy.

The next major steps in the development of thermophotovoltaic power technology involved improvements in materials science. In European Patent Publication 84 306033.6, R. E. Nelson describes a small strong mantle capable of withstanding 1000 g. This is almost 100 times stronger than the Welsbach type mantle. In U.S. patent application Ser. No. 07/864,088, filed May 16, 1986, now abandoned Goldstein and Goldstein et al show several approaches to improve selective emitters (U.S. Pat. Nos. 4,776,895, 4,793, 779, 4,806,095, 4,906,178, 5,281,131, 4,898,531 and 5,356, 487). In a totally new approach for strong emissive devices for implementing both small and large scale power generation appliances described by Goldstein in U.S. Pat. No. 5,503,685, and U.S. patent application Ser. No. 08/370,963. K. C. Chen, in a patent application that is to be filed, has described yet another major step in strength improvement of TPV selective emitters. Eva Wong has described, in U.S. Pat. No. 5,837,011, a method of manufacturing a ceramic felt that was employed in the device that demonstrated 2.4 Kwe, a world TPV power record as of April 1995 (Holmquist et al).

This multi-zone superemissive invention allows one to produce a series of improved TPV devices for the self-powering of various appliances to TPV electric power generators such as were originally described in U.S. Pat. Nos. 4,906,178, 5,356,487, 5,281,131 and several patent applications mentioned above; and the improvements over the originals are further described herein.

Ytterbia is a narrow band emitter which emits photons over a narrow range of energies with a half band width of about 100 nanometers centered at about 950 to 1000 nm. Use of this emitter material produces a substantial improvement in the thermophotovoltaic energy conversion efficiency when compared to the use of blackbody emitters and leads to the design and development of many practical devices for generation of electric power. As shown by Nelson in U.S. Pat. No. 4,584,426, the emissive output over the range of from 400 to 2500 nanometers should have 50% of the radiant energy within a single band.

Chubb estimated the optimum emitter temperature for a maximum efficiency for ytterbia superemitters of 3000° K., for erbia of 2000° K., for hohmia of 1500° K., and for neodimia of 1450° K. (Ref). It means that by placing the different superemitters in various temperature environment we can create such temperature profile that each emitter will generate narrow band photon emissions with the maximum efficiency.

It is clearly of significance in power generating system to enhance the thermal to light conversion efficiency. Thus, it is desirable to enhance the proportion of the thermal energy that goes into heating the emitter which is finally absorbed by the photovoltaic devices and efficiently converted to electric power.

It is also clearly advantageous to be able to create photons within a optical system that can concentrate the photons and or direct them to various target such as lasers, photovoltaic device, photolithography, photochemical reactors, photobiological reactors, photophysical reactors, plants, and other applications where photons are desired.

It is also clearly important to provide an effective PV cell temperature management as well as realize incoming combustible mixture preheating due to waste heat recuperation from emitters (radiant energy) and flux gases (convective heat).

SUMMARY OF THE INVENTION

There are a number of preferred embodiments in the practice of this invention which depend on the application, but all comprise a means to generate photons in at least one selected waveband and deliver the photons to a target using some optical materials to transmit the selected photons.

In several cases, a thermophotovoltaic (TPV) electric power generating system comprises a sequence of selective emitters and a sequence of matched photovoltaic (PV) collectors. Each selective emitter comprises at least one thermally stimulated quantum emitter material for emitting radiation in at least one wavelength band when heated above a threshold temperature. The photovoltaic collector comprises a series of PV cells matched to the emitter for selectively absorbing radiation in the same wavelength bands emitted by the corresponding emitter.

In the first preferred embodiment, an emitter for a self-powered gas appliance comprises an optically thin advanced emissive matrix (AEM) burner formed of a multiplicity of ceramic fibers sintered together or bonded filament(s) to form a rigid, gas permeable, optically thin body. This TPV device comprises of a series of zones each containing selective emitters, i.e. thermally stimulated quantum emitter material for emitting radiation in at least one band when heated. Each zone comprises of an emitter and PV matched system, with the higher energy, higher band gap system matched to each other in the hottest zone, the next highest energy and next highest band gap system matched to each other in the next hottest zone, and so on. The key to the success of the present embodiment over a single emitter is that the overall efficiency is greater. Because the temperature drop across the device is larger, a larger portion of the total energy is converted to photons and hence electricity. The fact that the higher energy rare earth emitters such as thoria oxide with 1 to 2% ceria and ytterbia are more efficient at higher temperature and the moderate energy emitter Er, Hy are more efficient at moderate temperature, and the lower energy emitter such as Ho, Nb are more efficient at lower temperatures.

A second preferred embodiment of the invention comprises a superemissive light pipe (SELP), including multizone thermally stimulated quantum emitters with a series of matched PV cells, which is designed for high electric power generation efficiency. A solid transparent material such as a sapphire, YAG, fused silica or fused alumina keeps the hot combustion gases confined and away from the photovoltaic materials, thus allowing the photovoltaic cells to be closer to the photon source. This solid burner system allows the air to be preheated, even if a recuperator is used, without flashback as long as the auto-ignition temperature of the premixed fuel/oxidizer mixture is not exceeded.

When fuel/oxidizer distributive layer is made of transparent material such as fused silica, YAG, sapphire or other, the PV cells can be installed inside of the combustible mixture plenum, so that the incoming mixture will cool PV cells resulting in better PV cells photon conversion efficiency.

The third embodiment of this invention uses a Transparent Full Face Injector (TFFI) system, where the TFFI is the optical device used to transmit the selected wavelength band of photons. The TFFI may comprise a series of tubes with slits or holes on one side or may be made of a solid shell with holes or slits in one side. Many other geometric arrangements and shape are possible for the TFFI. The TFFI technique has the advantage of reducing end losses and spectral mixing that may result in an AEM design which incorporates a sequenced multi-zone selective emitters for TPV applications.

Another embodiment of TFFI can be designed as a transparent tube (fused silica/sapphire/YAG, etc.) within the multiple holes/slots that provide a combustible mixture delivery to the combustion chamber and finally to the superemitters that surrounds this tube. PV cells may be installed inside of the transparent tube, so the incoming mixture cools them.

The same novel photon control and conversion principals may be applied to other heat sources such as a nuclear heat source. The higher temperature zone can be used to generate photons of higher energy, and the thermal energy dissipated from the highest temperature emitter is still very useful for a lower temperature emitter and so on. High temperature materials such as thoria, with 1 to 2 percent ceria, can operate for extended periods of time at well over 2700° C., where most other selected emitters melt. Therefore, there is a need to utilize a sequence of superemitters to take advantage of the fact that the photon output goes up dramatically as the temperature increases, and thus a sequence of superemitters with matched PV cells will allow an overall higher efficiency to be obtained in a TPV generator. The sequenced, multi-zone technique is very useful if one desires to work for high efficiencies which require very high temperatures, i.e. 2700° C.–3000° C., where thoria based emitters can operate, but rare earth oxides melt. (The same principle still holds true at lower temperatures, but to a lesser degree). Therefore, it is desirable to construct the first zone in the sequence from the highest temperature resistant material, the second zone from the next highest and so on, e.g. thoria/ceria first, followed by ytterbia, dysposia, erbia, and holmia, respectively. There are no practical limits to the number of stages in a sequence multi-zone device, but, in practice more than 1, but less than 12 are preferred.

BRIEF DESCRIPTION OF THE DRAWINGS

These and other features and advantages of the present invention will be better understood by reference to the following detailed description when considered in conjunction with the accompanying drawings wherein:

FIG. 1 illustrates a schematic cross section of a multi-zone optically thin emitter system matched to a photovoltaic collector system employed in the practice of this invention, using AEM combustion as the heat source;

FIG. 2 is an end view of a multi-zone SELP system heated by a porous shell surrounding the SELP AEM structure employed in practice of this invention;

FIG. 3 is a perspective schematic of an individual fiber optic used in the burner of FIG. 2;

FIG. 4 illustrates the end view a multi-zone thermophotovoltaic power generating system using an outside heat source and a series of SELPs which are sequenced with the highest energy photon emitter closest to the heat source;

FIG. 5 is a diagram indicating a TPV device utilization of energy from one emitter zone;

FIG. 6 is cross-sectional side view of a SELP containing one thermally stimulated quantum emitter;

FIG. 8 illustrates in schematic perspective a combustion driven inward firing TPV device using a sequence of solid wave guide emitters;

FIG. 10 is created by rotating the object in FIG. 8 into a cylinder with outward collection of photons by PV cells facing inward towards the heated superemitter, which is within a transparent combustion shell or TFFI;

FIG. 11 illustrates in perspective view a toroidal TPV generator formed from the element shown in FIG. 10;

DETAILED DESCRIPTION

Figure 12:
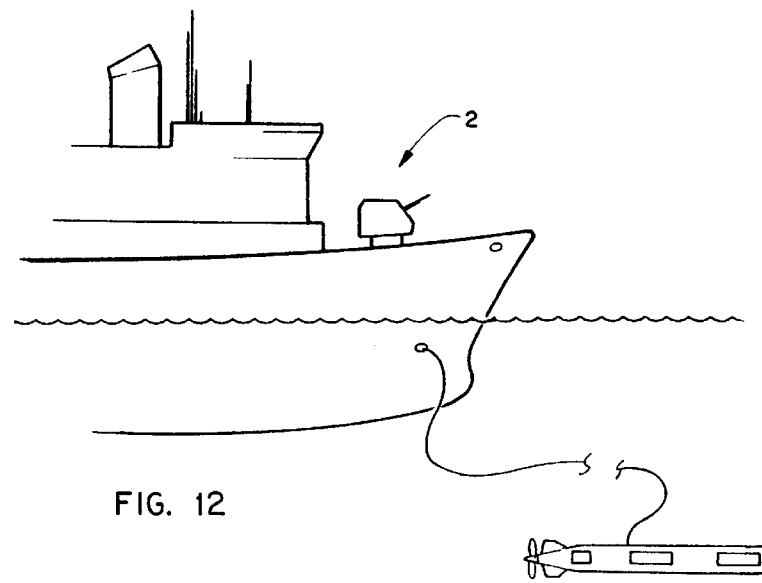
FIG. 12 depicts in schematic view a UUV application where the PV converter is located far from the photon generator section, which is on a surface ship.

FIG. 1, illustrates schematically a multi-zone photovoltaic power generating system as may be employed in practice of this invention. In this embodiment three roughly cylindrical emitters 150, 151, and 152 are centrally located one atop the other in a sequence with highest temperature zone 250 closest to the heat source or initial combustion area within the apparatus. Surrounding each emitter are a plurality of photovoltaic cells in sequence, with each zone spectrally matched to the emitter such that the first set of PV arrays 350 is followed by 351 and 352, respectively. All of these PV cells may be fitted with a cooling means (such as a heat pipe, heat sinks or liquid cooling) 448 to prevent overheating. For this later purpose, a transparent heat shield 500 may also be interposed between the emitters and the photovoltaic collector system 300. A photon filter means (not shown) may be coated onto the transparent heat shield 500 or may be on a second separate tube (not shown). The photon filters or band pass filter photon system comprises of a series of different band pass wavelengths filters corresponding to the PV cell it is closest to. Each filter may be designed to pass only the photons selected for each zone.

As described in greater detail hereinafter, each emitter comprises thermally stimulated quantum emitting materials which emit characteristic radiation in at least one wavelength band. This multi-zone concept is indicated schematically in FIGS. 1 though 6 by representing radiation with shortest wavelength 650, intermediate wavelengths 651 and longest wavelength 652. It should be recognized that such radiation is emitted in all directions rather than the specific directions indicated schematically in these drawings. Similar indications of such radiation are included in FIGS. 1 to 6.

Radiation from the emitters is absorbed and converted to electric power by each zone of PV collector to provide high conversion efficiency. Such a PV collector may be fabricated on a transparent substrate 60 (as shown in FIG. 5) and/or be protected by a transparent heat shield 500 (as shown in FIG. 1). The active portion of the collector is quite thin, for example 10 to 10,000 microns, and the illustration in FIG. 1 is only schematic without attempting to indicate the relative thickness of the three various PV cells 350, 351, and 352 forming the PV collector system 300. A thin reflector may be placed on the back of each PV cell so that radiation that may pass through the photoelectric active PV layer without absorption is reflected back through such layers to enhance the total absorption.

The underlying photo-active layer comprising any one of the PV cells, should have a high degree of absorption of photons throughout the spectrum peak of the corresponding emitter to enhance overall efficiency of the collector. The photo-active layer of PV cell 350 preferably comprises a PV material such as GaAs, InGaAs, amorphous silicon, or similar material with shorter wavelength bandgap. Amorphous silicon is actually a silicon-hydrogen "alloy" having the approximate formula $SiH_{0.16}$, and therefore is preferred for emitters with peak emission band centered at about 5200 nanometers. By doping and varying the hydrogen content, the absorption band can be shifted as desired to match the emission characteristics of the emitter. The photo-active layer of the next PV cell 351 maybe made of silicon, $CuInSe_2$ or other similar photovoltaic materials.

Anti-reflective coatings (not shown) applied over the photo-active layers of the PV cells will minimize reflections at interfaces of materials with different indexes of refraction, such as illustrated in FIG. 1. The concept of reflecting radiation of different wavelengths than those wavelengths to be absorbed by a particular PV cell is important in achieving higher efficiencies than with a single emitter collector TPV system.

Typically, the various coatings on the transparent substrate forming the band pass filter are deposited successively on the transparent substrate. Additional bonding materials (not illustrated) may also be employed. Furthermore, each PV cell has electrical leads for conducting the generated electricity away for use, (not shown).

The materials employed to make band pass filter have been published in the literature (ref ARPA Special Technical Report to be published Holmquist, et. al.). Several layers of oxides (such as InSn Oxides) may be utilized to enhance filter efficiency. The materials mentioned above are merely exemplary of other materials that may be used to reflect radiation in characteristic wavelength bands. It will also be apparent that additional layers may be employed for optimum reflection in characteristic bands matched to radiation emitted by a multi-zone multi-band emitter system. For example, it is desirable to employ two separate layers with selective reflector bands above and below the selected wavelength band of interest for absorbing and converting into electricity.

In these embodiments the emitter system are a series of optically thin porous ceramic combustion burners using the AEM technology described in U.S. Pat. No. 5,711,661 and U.S. patent application Ser. No. 08/482,217. Such a burner is formed on a metal or ceramic distribution means 701 and comprises a mixing means chamber 707 and a fuel inlet 710 and an oxidizer inlet 717. For example, a combustible mixture of air and natural gas or vaporized LPG is introduced into the burner. Fuel and oxidizer pass through openings 710 and 717 respectively as shown in FIG. 1 and then pass through the mixing chamber 707 and then after mixing, the mixture passes though the burner distribution means 701. Combustion occurs in the matrix formed by the emitters 150, 151, and 152. The filaments or fiber structures of the emitters, such as illustrated in FIG. 1, are thereby heated to a sufficiently elevated temperature to emit radiation.

Each emitter structure, as suggested by FIG. 1, emits radiation in at least one characteristic wavelength band. The characteristic wavelength band emitted are a function of the thermally stimulated quantum emitting materials employed for fabricating the ceramic fibers. For example, the highest temperature emitter structure 150, emits radiation of shortest wavelength 650. The emitter with the next highest temperature 151, emits radiation of intermediate wave length 651, and the emitter of the lowest temperature emits radiation of the longest wavelength 652.

A number of different materials may be used to provide multi-band thermally stimulated quantum emission suitable for use in practice of this invention. Preferably the materials comprise oxides with sufficient mechanical strength to support each AEM structure making up the emitter and provide adequate emission of radiation in the desired wavelength bands.

In the practice of this invention the multi-zone emission spectrum is sequentially matched to a single or multiple band gap PV cell, not shown in FIGS. 2, 3, or 4. The multi-layer PV case may be desirable such as in FIG. 1, i.e., to match conversion characteristics of the top cell to the emitter in that zone and the bottom cell to lowest wavelength or adjacent zone emitter. Thus, each layer in the cell has a band gap that causes high absorption of radiation of a characteristic wavelength similar to the radiated wavelength of the quantum emitter. Each layer converts the emitted photons from the nearest zone of selected band to electricity at a high efficiency, and passes radiation from adjacent zones not converted by the top layer to an underlying layer which effectively converts the remaining wavelength bands from all or some of the adjacent layers.

Such a combination of selective multi-zone quantum emitters and matching multi-layer photovoltaic cells is capable of producing electric power at higher efficiency than simpler systems. Theoretical conversion efficiencies are greater than 50%. It is believed that over 60% of the total energy emitted is in the energy range that can participate in photovoltaic conversion using a multi-zone, multi-layer photovoltaic cell. This can be compared with blackbody radiation where only about 30% of the total energy emitted can participate in the conversion mechanism which produces electricity in a similar device at a similar temperature.

In a second embodiment of the present invention it is preferred that the host material be relatively inexpensive and have a low spectral emissivity as well as form an optical waveguide into which superemitter materials may be incorporated. Suitable base materials include silicon oxide, aluminum oxide, gallium oxide, yttrium oxide, yttrium alumina granet (YAG), thorium oxide, zirconium oxide, and other waveguide materials. "Low spectral emissivity" as used herein means emissivity in about the same range as the spectral emissivity of such materials.

A superemissive light pipe (SELP) 1000, as shown in FIG. 6, is a material from which selected bands of thermally stimulated quantum emission are obtained by adding one or more materials to the base waveguide material. For example, metal oxides and fluorides are suitable. The superemissive material added to the host preferably include rare earth metals. Examples of particularly useful materials include oxides of ytterbium, holmium, dysprosium, neodymium, protactinium, terbium, erbium and cerium. Actinide metals may also be used, for example thorium oxide may be doped with 1 to 2% cerium oxide to yield a broad peak of wavelengths from at least 800 to 400 nm.

The generalized formula for an oxide SELP is $M_xZ_{1-x}O_{1-x}O_{(1.5+0.5x)}$ where M is a metal selected from the group consisting of aluminum, gallium, yttrium, zirconium and thorium and Z can be an actinide, lanthanide or other metal with inner shell electron vacancies. It is such metals that have a vacant inner electron hole to promote emission of thermally stimulated quantum radiation.

The proportion of thermally stimulated quantum emitter material in the composition may be relatively small. For example, with an alumina or alumina yttria ceramic base, the addition of as little as 0.02% by weight protactinium oxide in the composition can be sufficient. The proportion of terbium oxide may be less than 1%. About 1% erbium or 2% cerium oxide is sufficient to produce selected band emissions. Although, often the optimum concentration is higher.

As shown in FIGS. 5 and 6, a superemissive light pipe SELP 1000 is contained within a heat source 515 and includes thermally stimulated quantum emitting ceramic materials 616. A porous waveguide of design 901 or 902 may be employed as shown in FIGS. 6 and 2, respectively. The holes may be impregnated by a solution containing the superemitter such as an alkoxide, nitrate, or acetylacetonate. For example, such a solution may be formulated with thorium nitrate and cerium nitrate, or erbium alkoxide. Any of the rare earth metals or other metals capable of superemitting as defined above may be used in appropriate proportions to result in compositions as described above. When the nitrate solutions are used, the impregnated porous light pipe may be treated with a reducing agent such as ammonia gas to reduce the nitrates to hydroxides before reducing further to the oxides upon heating or subsequent processing.

If desired, other techniques may be employed for forming a porous waveguide substrate for use with a combustion burner or other heat sources. One such method involves the use of silicon or aluminum alkoxide or similar organometallic such as an acid, which can be stable in air, then the material can be dissolved in a solvent and spun into fibers. An alternate low cost method uses a colloidal material (e.g., silica or alumina) with a corresponding silicate (e.g., potassium silicate or aluminum silicate) and an organic agent such as formamide, a small amount of water or acid may also be employed. The mixtures are first blended and then cast in a mold, aged, cured and then fired.

In addition it is possible to dope the waveguide in the melted state and then pull the doped silica, alumina, YAG, thoria, yttria and other similar waveguide materials from the molten state to form an SELP. It is also possible to dope solgel aluminia precursors with superemissive materials to increase total superemitter in the waveguide system.

The use of a transparent burner to direct the combustion process into the surface of an emitter can be used with any blackbody or superemitter. A novel device using a transparent burner with PV cells very close to the emitter is depicted in FIG. 8. The transparent porous distribution chamber 1300 mixes and distributes the fuel and oxidizer 299 which enters through the plenum 289. The combustion is injected into the sequence of superemitters 1150, 1151 and 1152, respectively. The exhaust 1333 exits through the exhaust manifold 1299. The photons of selected wavelengths are emitted from the hot superemitters 1151, 1152, and 1153. These photons (not shown) are collected by a series of PV cells 350, 351, and 352. The PV cells are cooled by a cooling system 440. There is very little mixing of photons from the hottest emitter 1150 with its next hottest neighbor 1151 and so on, because of the small distance between emitter and collector. If preheating or recuperation are not employed, this distance can be very small compared to the distance between 1150 and 1151.

As an alternative to the embodiment of transparent burner system shown in FIG. 8, superemitters 1150, 1151 and 1152 may be made of the same superemissive material. Such an embodiment creates a uniform distribution of emitted photon wavelengths which is especially useful in pumping lasers or in the running photochemical reactors, both of which require a specific wavelength of radiation.

Taking into account that the superemitters surface that is facing the burner has a higher temperature, it is possible to design permeable or not permeable superemitter as a sandwich, so the hot surface will be make of a material that will provide the maximum narrow band emissions at higher temperature and the second layer with lower temperature emitter, for example Yb/Er or Yb/Ho, structures ect. In this case the emission from hotter emitter will be captured by a PV cell with shorter absorption characteristics, and the longer wavelength photon emission will be directed to a PV cell (not shown) with longer wavelength absorption. For example, one or more SiPV cell can be installed inside of the transparent burner, and one or more GaSb cell can be placed outside of the superemitter.

Another embodiment of such a design can be made by inserting PV cells into the transparent burner (not shown). In this case the incoming combustible mixture will provide an additional PV cells cooling. Such a design will allow to improve PV cells efficiency and to make the TPV device more portable.

This design may be made more efficient by rotating the unit through a circle to form an outward photon collection unit 379 as shown in FIG. 10, with PV cells 350 on the outside. In such a design, the transparent burner 1300 inject flame on the emitter 1150, 1151, and 1152, respectively. This method can be made even more efficient by adding a recuperator 360 and by eliminating end losses by forming the cylinder into a torous 377 as shown in FIG. 11. After the exhaust 1333 passes through the recuperator 360 it exits through the exhaust manifold 1299. The PV cell 350 is cooled by the cooling means 440 and also by incoming oxidizer, or mixed fuel and oxidizer, or both depending on if there is one or two enclosures. This outward located PV method can be reversed (not shown) i.e., with PV cells on the inside and emitter recuperator and exhaust on the outside. The advantage is to the lower cost of the electricity generated by PV cells with a higher concentration of light and thus greater efficiency. This reverse method, with PV cells located inside the transparent burner firing outside onto the fiber matrix emitter, can also be made more efficient by forming a torous (not shown) to reduce end losses. A fuel oxidizer entry and exit port may be provided as shown in FIG. 11, to the toroidal structure.

An additional (longer wavelength absorption PV cells) can be installed outside the superemitters, specially if the superemitter is made as a tandem—high temperature emitter faced to the burner, lower temperatures emitter creates the outer layer.

Other possible uses for efficient photon generators like these is to pump lasers, provide light, to photochemical reactors and provide secure power transmission via light pipes or fiber optic waveguides.

Figure 14:
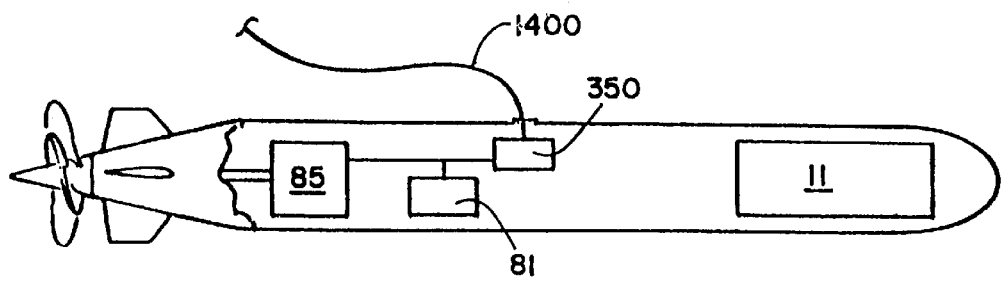
FIG. 14 illustrates another end of the device shown in FIG. 13, the fiber optic device carrying photons from any photon generator to the remotely operated vehicle, where the power and control system is operated via a fiber optic tether.

FIG. 14 illustrates one type of remotely operated vehicle an Unmanned Underwater Vehicle (UUV), which carries a payload 11. The power for the electric driven propulsion system 85 may be powered directly from the selected photons flowing through the cable 1400 onto the PV cell 350 which convert the photons to electricity that flows either to the battery 81 or to the electric driven propulsion system 85 or other electric powered propulsion means.

Figure 15:
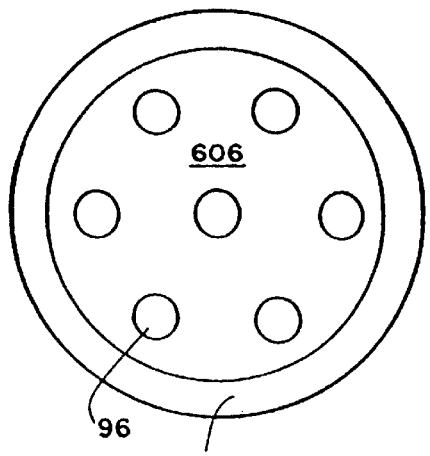
FIG. 15 depicts an end view of a nuclear reactor SELP system.
Figure 16:
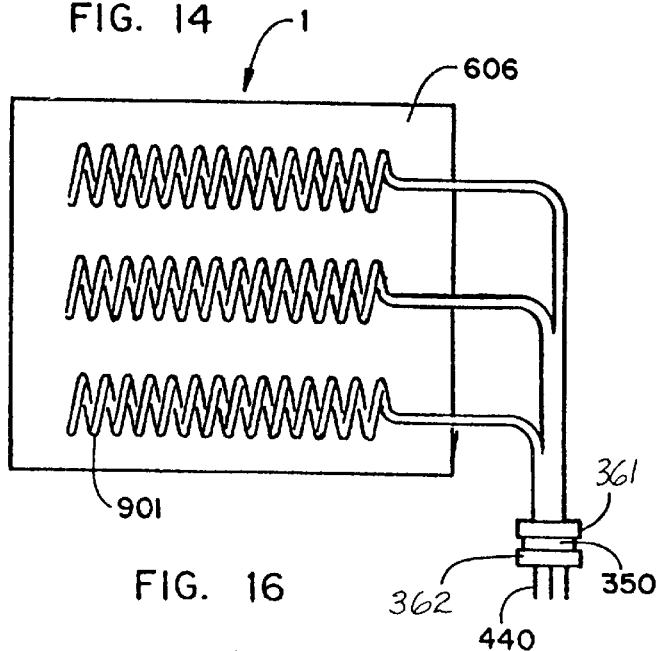
FIG. 16 illustrates in schematic the SELP within a heat source such as a nuclear reactor.

FIGS. 15 and 16 show end and side views of a heat source such as a hot gas surrounded by a superemitter material 616 which also acts to insulate and contain the gas which may be heated by a nuclear source. The SELP 901 provide a means to remove the heat from the system in the form of selected radiation and convert it to useful work. PV cells 350 are held by a means 361 and 362, and are cooled by sources within the device 1, and a number of holes 96 are placed within the solid 606 for removing the energy via SELP systems 901.

Figure 17:
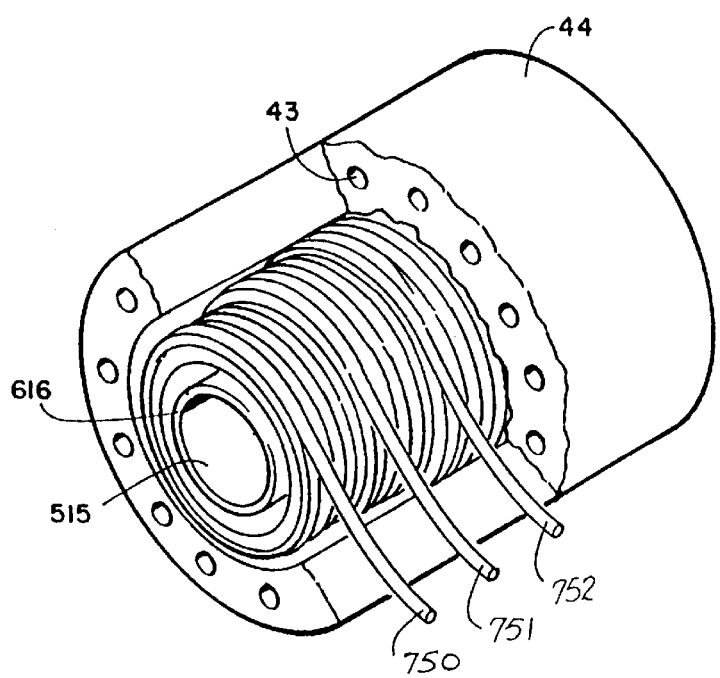
FIG. 17 illustrates in schematic perspective a centrally located nuclear or radioisotope heat source which is surrounded by a sequence of SELP coils, which coils carry the photons array to some target.

FIG. 17 illustrates a series of multi-zone SELP 750, 751, and 752 coiled around a heat source 515. The SELPs may be surrounded by heat contain system 44 which may containing an insulating system 43. Reflectors may also be employed (not shown).

For example, doping (impregnating) the porous waveguide with a quantum emitting ceramic at least adjacent to the hot side of the waveguide as shown in FIGS. 5 and 6. For example, the lens shaped waveguide 175 may be employed to concentrate the photons and focus them into a fiber optic 185.

A solid ceramic emitter is shown in a schematic longitudinal cross section in FIG. 3. In this embodiment, fuel and oxidizer 299 are mixed before entering transparent combustor 1300 and are ignited by an ignitor (not shown). Combustion takes place inward from the cylindrical combustor 1300 and the combustion products are ejected through a number of small holes 320 in the inner wall 322 so that the hot combustion takes place within the chamber 13 and the flame and gases impinge on the surface of an outer superemissive waveguide 660 and on the surface of an inner superemissive waveguide 651, each in the shape of a coil. In a preferred embodiment, the outer and inner superemissive waveguides are SELPs. The impingement of flame and gases onto the waveguides results in a high rate of energy transfer between the combustion gases and the outer waveguide, and a lesser rate of energy transfer between the combustion gases and the inner waveguide. Another option in this design is to bring the fuel oxidizer in separately (not shown). This highly turbulent form of convective energy transfer is augmented by radiation energy transfer between the outer SELP within the combustion inward firing tube. After interacting with the outer 660 and inner 651 coils, the combustion gases are exhausted out one end of the tube and may be converted to useful work elsewhere in the system by circulation through a heat exchanger (not shown). If the exhaust gases are used in the recuperator (not shown), i.e., some of the energy of the hot exhaust gases may be used for preheating the incoming air (and or fuel).

Alternatively to FIG. 3, with a transparent gas distributor, the inner surface 322 of the combustor tube may be a thermally stimulated quantum emitter oxide or mixed oxides, which provide at least on narrow band emission of selected wavelength being generated by the SELP's 660 and 651. Exemplary material for both the combustor and the inner surface of the combustor comprises silicon dioxide, aluminum oxides, YAG, thoria as the substrate and a thin layer of a rare earth metal oxide on the outside. The narrow band emissions are absorbed by a plurality of PV cells 350 and 351, attached to the end of the fiber optic filament 1400 (or multi-layer photovoltaic cells for multi-band superemitters like holmia which have more than one peak (not shown)).

Although a holmia multiple band quantum emitter has been described above, it will be apparent that many other such quantum emitters are suitable for use in practice of this invention. Likewise, a variety of materials may be used in the multiple layers of the photovoltaic devices for selectively absorbing in wavelength bands matched to the wavelength bands of the emitter. These may be materials different from those herein above mentioned, or may be similar with doping to change the band gap and hence, the wavelengths absorbed.

Additional PV cells can be installed inside of the transparent incoming mixture plenum, so this mixture will provide additional PV cell cooling. It is also possible to install PV cells outside the combustible mixture plenum if the back wall is also transparent. In this case it will be beneficial to make the back wall of band pass filters or provide coating that will allow only narrow band photons to pass which is close to the maximum absorption spectrum of PV cells.

Figure 9:
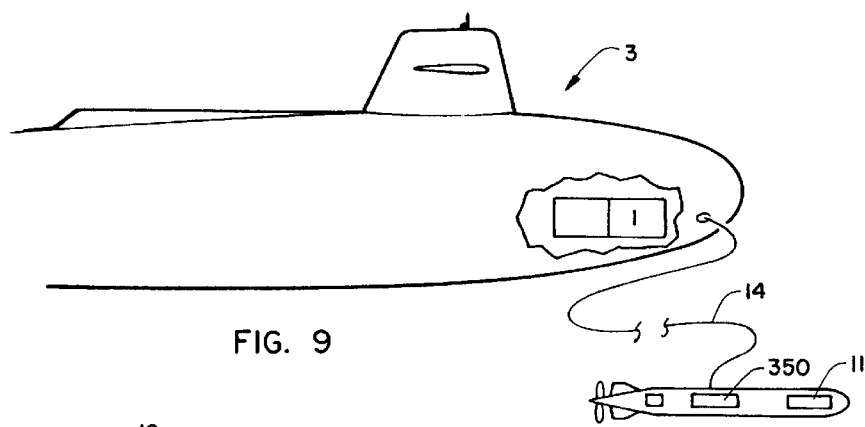
FIG. 9 illustrates in perspective a UUV application where the PV converts the photons to electricity far away from the photon generator, which is on board a submarine under the ocean.
Figure 13:
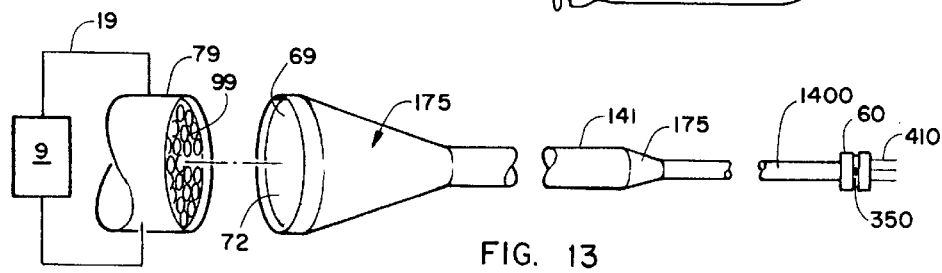
FIG. 13 depicts in side view the use of a laser diode as a source of photons which are concentrated and directed into an optical fiber.
Figure 7:
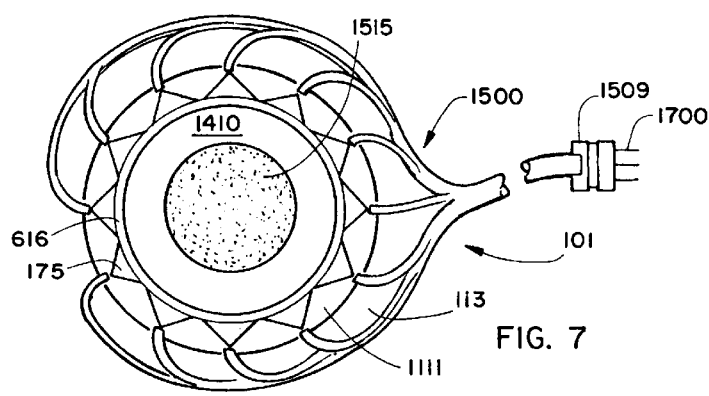
FIG. 7 is a schematic cross sectional view of quantum emitter incorporated within a waveguide (optical fiber) or a superemissive light pipe for both small and large power generation and other applications where PV cells are far away from a centrally located heat source within the photon generator.

Another embodiment of the invention 101 uses an outward SELP is depicted in FIG. 7. The heat source 1515 could be any such as nuclear, solar, chemical. In the case of a radioactive source, a radiation shield 1410, which is surrounded by a superemitter 616 may be attached to a means to concentrate the selected photon emission, which in turn is surrounded by a insulation system (not shown). The energy from the system is removed primarily through the fiber optic system 1500, consisting of many optical waveguides each of which has a PV cell 1509 at one end. The PV cells are cooled by a cooling system 1700 which may be kilometers away. Such as in a remote underwater vehicle as illustrated in FIGS. 9 and 12.

In another preferred embodiment of this invention, such as in the Full Face Transparent Injector, it may be desirable to use single band PV cell types, particularly if cost is a very important factor. Multi-band emitters may also be matched to single band PV cells or the photon beam may be split by some means (such as a hologram, diffracture gratting, or prism) to direct each of the peaks from a multi-band emission to a series of PV cells, each matched to the appropriate emission peak.

Many other modifications and variations will be apparent to one skilled in the art, and it is therefore, to be understood that within the scope of the following claims, the invention may be practiced otherwise than as specifically described.

What is claimed is:

1. A multi-zone thermophotovoltaic electric power generating system comprising:
    a burner for distributing and combusting a fuel-oxidizer mixture, the burner being transparent to photon transmission;
    a series of ceramic emitters disposed adjacent the burner to receive heat energy produced by combustion, wherein each emitter comprises at least one thermally stimulated quantum emitter material for emitting radiation in at least one wavelength band when heated above a threshold temperature; and,
    a series of photovoltaic collector cells disposed adjacent a burner surface opposite from the series of ceramic emitters, wherein the cells are matched to a respective emitter for selectively absorbing radiation in the same wavelength bands emitted by the emitter.

2. A system as recited in claim 1, wherein the emitter comprises oxides of metals having unfilled inner electron shells.

3. A system as recited in claim 2, wherein the emitter comprises at least one rare earth metal oxide.

4. A system as recited in claim 3 wherein, the emitter comprises erbium oxide.

5. A system as recited in claim 1, wherein the emitter comprises an oxide of at least one metal selected from the group consisting of aluminum, gallium, yttrium, zirconium and thorium.

6. A system as recited in claim 1, wherein the emitter comprises at least 50% aluminum oxide, from 8 to 20% yttrium oxide and less than 20% rare earth metal oxide.

7. A system as recited in claim 6, wherein the emitter further comprises an oxide of a metal selected from the group consisting of magnesium and tin.

8. A system as recited in claim 1, wherein each photovoltaic collector comprises an active layer that selectively absorbs at least one characteristic wavelength band of radiation and is transparent to radiation in other wavelength bands.

9. A system as recited in claim 1, wherein emitters are heated with combustion gases which are introduced into a combustion chamber via a distribution layer or plenum that are each transparent to photon transmission.

10. A system as recited in claim 9, where in the photovoltaic collector cells are installed inside of a combustible mixture plenum having a distribution layer that is transparent to photon transmission.

11. A system as recited in claim 9, wherein the photovoltaic collector cells are located outside of a combustible mixture plenum and facing a transparent back wall portion of the plenum.

12. A system as recited in claim 11, wherein the plenum back wall is made of a band pass filter or is coated with material that allows the passage of a narrow band photon emission that is within the absorption spectrum of a photovoltaic collector cell.

13. A multi-zone thermophotovoltaic electric power generating system comprising:
- a plurality of superemissive light pipes each of which is a waveguide comprising a low emissivity ceramic material and at least one thermally stimulated quantum emitting material;
- means for heating said superemissive light pipes to a sufficient temperature for stimulating inner electron shell quantum transitions in the material so that radiation emitted therefrom is in at least one characteristic wavelength band; and
- a plurality of photovoltaic devices, wherein each photovoltaic device has a band gap that selectively absorbs and converts the emitted radiation to electric current.

14. A system as recited in claim 13, wherein the waveguide material comprises an oxide of a metal selected from the group consisting of silicon, aluminum, thoria and yttrium and mixtures their of.

15. A system as recited in claim 14, wherein the waveguide further comprises a rare earth metal oxide.

16. A system as recited in claim 13, wherein the plurality of superemissive light pipes are arranged so that the hottest comprises material that emits radiation having the highest energy selected peak, and the coolest comprises an oxide of a metal selected from materials that when heated produces radiation having the lowest energy selected peak.

17. A system as recited in claim 16, wherein the plurality of photovoltaic cells are matched to convert the corresponding peaks of a respective emitter.

18. A system as recited in claim 13, wherein the superemissive light pipes are arranged so that one formed from the hottest emitting material is positioned closest to the heat source, and superemissive light pipes formed from progressively cooler emitting materials are positioned progressively further away from the heat source.

19. A system as recited in claim 13 or 18, wherein the photovoltaic device comprises a plurality of layers of photovoltaic material, wherein at least an upper layer selectively absorbs radiation of one characteristic wavelength band and is transparent to radiation of other characteristic wavelengths, and wherein an underlying layer absorbs the other characteristic wavelength band emitted by nearby superemitters in the zone.

20. A system as recited in claim 13 wherein the superemissive light pipes comprise at least one thermally stimulated quantum emitting material on at least its outer surface.

21. The power generating system as recited in claim 13 wherein the thermally stimulated quantum emitting material is formed from a metal oxide having unfilled inner electron shells so that more than 50% of emitted radiation generated is thermally-stimulated quantum radiation.

22. A multi-zone thermophotovoltaic electric power generating device comprising:
- a porous distribution chamber for distributing a fuel-oxidizer mixture for combustion, the distribution chamber being transparent to the transmission of radiation;
- a sequence of optically-thin porous combustion emissive matrix bodies disposed adjacent the distribution chamber, wherein each emissive matrix body is formed from a multiplicity of ceramic bodies sintered together to form a rigid, gas-permeable body, wherein the emissive matrix bodies each generate radiation within a characteristic wavelength band; and
- a sequence of photovoltaic cells disposed adjacent to the emissive matrix bodies, wherein each cell absorbs radiation within a characteristic wavelength band of a respective emissive matrix body;
- wherein the porous distribution chamber is interposed between the sequence of emissive matrix bodies and the sequence of photovoltaic cells.

23. A device as recited in claim 22, wherein the ceramic bodies comprise metal oxide fibers.

24. A device as recited in claim 23, wherein the ceramic bodies comprise at least one rare earth metal oxide.

25. A device as recited in claim 22 wherein the ceramic bodies comprise a first oxide of at least one metal selected from the group consisting of silicon, aluminum, gallium, yttrium, zirconium, alkali earth, alkaline earth, thorium, uranium, and plutonium, and comprise a second oxide of the transition or rare earth metals.

26. A multi-zone thermophotovoltaic device comprising:
- a burner having a fuel oxidizer mixing chamber that is transparent to photons to permit photon transmission therethrough;
- a sequence of superemitter bodies disposed adjacent the burner, wherein each superemitter body produces a photon emission within a characteristic wavelength band and is positioned within the device to operate at a near peak efficiency temperature; and
- a plurality of photovoltaic cells disposed adjacent the superemitter bodies, wherein the photovoltaic cells are sequenced to match the sequence of the superemitter bodies, wherein the superemitter bodies and photovoltaic cells are positioned at opposite sides of the fuel oxidizer mixing chamber.

27. An energy system for providing energy to a remotely-powered object comprising;
- a plurality of photon emitters at one location, each emitter producing photons at a characteristic wavelength band;
- a plurality of waveguides for receiving photons generated by the plurality of photon emitters and transmitting the photons to a remote object, the waveguides being attached at one end to the first location and at an opposite end to the remote object; and
- a plurality of photovoltaic cells disposed on the remote object for receiving the photons delivered by the waveguides and converting the same to electricity to power the remote object, wherein the photovoltaic cells absorb photons within a characteristic wavelength band of a respective photon emitter.

28. A combustion thermophotovoltaic electric generator comprising:
- a circular burner structure that is transparent to photon transmission and that is designed to direct combustion radially inwardly;
- one or more emitter bodies formed from a material that emits at least one selected wavelength band of radiation, which emitted radiation passes radially outwardly away from the one or more emitter bodies and though the transparent burner structure; and
- an array of photovoltaic cells disposed radially outwardly from the burner structure and positioned radially adjacent a respective emitter body.

29. The generator as recited in claim 28 having a toroidal shape and comprises:
- means for providing fuel and oxidizer to enter the torus; and means for allowing combustion products to exit the torus.

30. An energy system comprising:

a burner for combusting a fuel and oxidizer mixture;

a waveguide system for transmitting heat energy generated by the burner;

an emitter body for receiving the transmitted heat energy and producing a photon emission within a characteristic wavelength band; and a photovoltaic cell for converting the photon emission from the emitter body to electricity, wherein the photon emission is transmitted from the emitter body to the photovoltaic cell via the waveguide system.

31. A system as recited in claim 30 further comprising means for separating the photon emission into more than one peak.

32. A system as recited in 30 wherein the emitter body comprises a selective metal oxide material that is matched to the photovoltaic cell and a transmission window of the waveguide system.

* * * * *